(12) United States Patent　　(10) Patent No.:　US 12,632,949 B2
Iwabuchi et al.　　(45) Date of Patent:　May 19, 2026

(54) IMAGE PROCESSING APPARATUS AND CONTROL METHOD

(71) Applicant: CANON KABUSHIKI KAISHA, Tokyo (JP)

(72) Inventors: Kohei Iwabuchi, Kanagawa (JP); Yuuichi Nitto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 18/297,876

(22) Filed: Apr. 10, 2023

(65) Prior Publication Data

US 2023/0368364 A1　Nov. 16, 2023

(30) Foreign Application Priority Data

May 16, 2022　(JP) ................................. 2022-080352

(51) Int. Cl.
　　*G06T 7/00*　　(2017.01)
　　*G06F 3/04817*　(2022.01)
　　*G06T 5/50*　　(2006.01)
　　*G06T 7/90*　　(2017.01)
　　*G09G 5/373*　　(2006.01)

(52) U.S. Cl.
　　CPC ........ *G06T 7/0008* (2013.01); *G06F 3/04817* (2013.01); *G06T 5/50* (2013.01); *G06T 7/90* (2017.01); *G09G 5/373* (2013.01); *G06T 2207/10024* (2013.01); *G06T 2207/20221* (2013.01); *G09G 2340/04* (2013.01)

(58) Field of Classification Search
　　CPC . G06T 7/0008; G06T 7/90; G06T 5/50; G06F 3/04817; G06G 5/373

USPC .......................................................... 382/141
See application file for complete search history.

(56) References Cited

U.S. PATENT DOCUMENTS

| | | | | |
|---|---|---|---|---|
| 11,195,255 | B2 * | 12/2021 | Nitto ......................... | G06T 7/11 |
| 11,430,107 | B2 | 8/2022 | Iwabuchi | |
| 11,941,868 | B2 * | 3/2024 | Yonetani .................. | G06N 3/08 |
| 2002/0009220 | A1 | 1/2002 | Tanaka | |
| 2018/0293725 | A1 * | 10/2018 | Ohshima ................ | G03B 37/02 |
| 2019/0303698 | A1 * | 10/2019 | Hwangbo ............ | G06V 30/274 |
| 2020/0073641 | A1 * | 3/2020 | Imazawa ................... | G06F 8/35 |
| 2020/0193582 | A1 | 6/2020 | Iwabuchi | |
| 2022/0207703 | A1 * | 6/2022 | Hamabe ................. | G06V 10/36 |
| 2022/0358749 | A1 * | 11/2022 | Yonetani ................ | G06N 3/094 |
| 2023/0073949 | A1 * | 3/2023 | Zhang .................. | G06V 10/761 |

(Continued)

FOREIGN PATENT DOCUMENTS

| | | |
|---|---|---|
| JP | 2001-264267 A | 9/2001 |
| JP | 2008-046065 A | 2/2008 |
| JP | 4848532 B2 | 12/2011 |

(Continued)

OTHER PUBLICATIONS

Jan. 23, 2026 Japanese Official Action in Japanese Patent Appln. No. 2022-080352.

*Primary Examiner* — William D Titcomb
(74) *Attorney, Agent, or Firm* — Venable LLP

(57) ABSTRACT

An image processing apparatus comprises a display control unit that displays defect information detected from an image in which an inspection target is captured, on a display unit in association with the image. The display control unit controls a method of displaying the defect information based on a display size of at least one of the image and the defect information.

8 Claims, 8 Drawing Sheets

(56)     References Cited

U.S. PATENT DOCUMENTS

| 2023/0196540 A1 * | 6/2023 | Shukla | G06V 10/44 |
| | | | 382/103 |
| 2023/0281749 A1 * | 9/2023 | Fedorov | G06T 1/60 |
| | | | 345/543 |

FOREIGN PATENT DOCUMENTS

| JP | 2019-053050 | A | 4/2019 |
| JP | 6569002 | B2 | 8/2019 |
| KR | 10-2168724 | B1 | 10/2020 |
| WO | 2017/103982 | A1 | 6/2017 |

* cited by examiner

FIG. 3A1
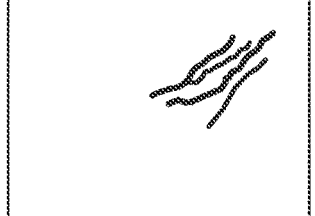
FIG. 3A2
FIG. 3B1
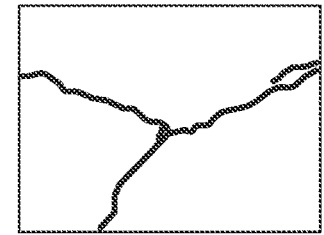
FIG. 3B2
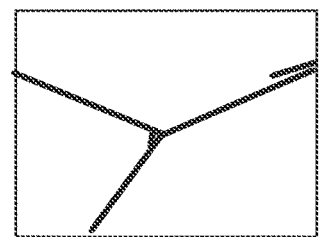
FIG. 3C1
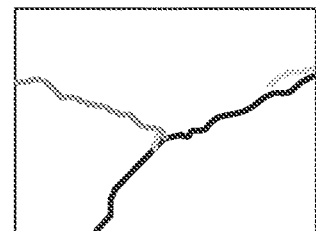
FIG. 3C2
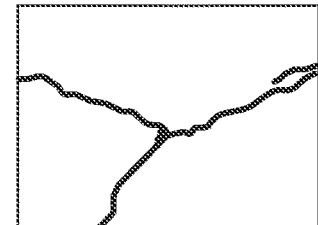
FIG. 3D1
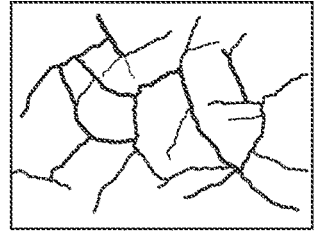
FIG. 3D2
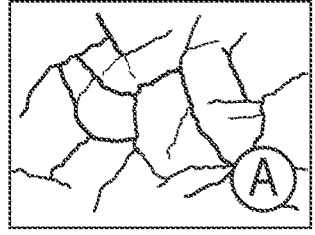
FIG. 3E1
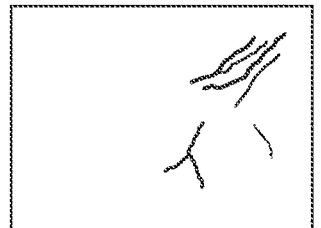
FIG. 3E2
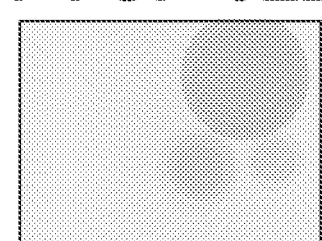

F I G. 4
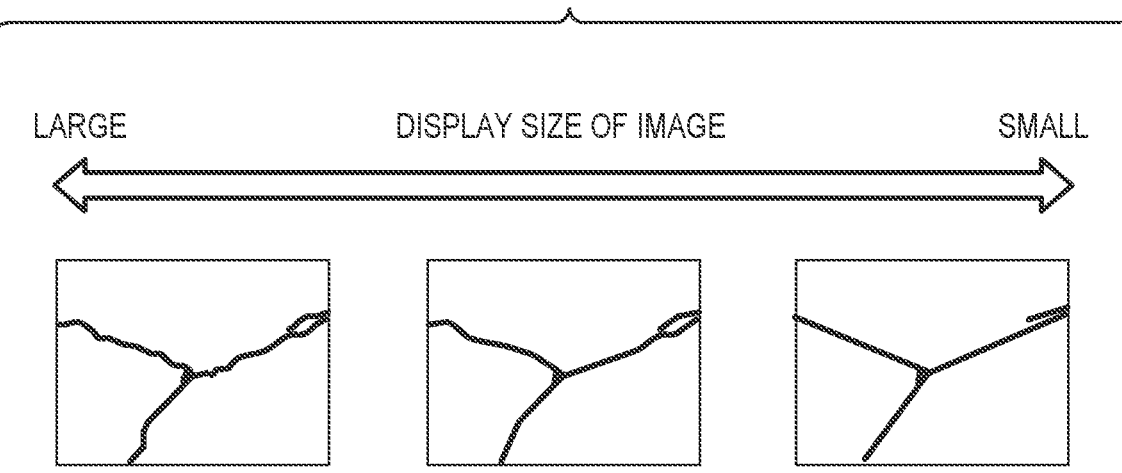
LARGE DISPLAY SIZE OF IMAGE SMALL

| IMAGE INFORMATION ID | FILE PATH | IMAGE CAPTURING DATE AND TIME | DETECTION RESULT |
|---|---|---|---|
| 1 | /images/bridge_a/20211019/img_0001.jpg | 2021/10/19 10:07 | { "damage": 0.3, } |
| 2 | /images/bridge_a/20211019/img_0002.jpg | 2021/10/19 10:16 | { "type": "ALLIGATOR CRACKING", "damage": 0.6, } |
| 3 | /images/bridge_a/20211019/img_0003.jpg | 2021/10/19 10:32 | { "damage": 0.2, } |
| ... | ... | ... | ... |

500

501   502   503   504

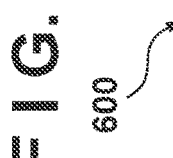
F I G. 6
600
| DEFECT INFORMATION ID 601 | IMAGE INFORMATION ID 602 | TYPE 603 | SHAPE 604 | ATTRIBUTE 605 |
|---|---|---|---|---|
| 1 | 1 | CRACKING | [(x11,y11), (x12,y12), …] | { "confidence": 0.8, "width": 0.2, } |
| 2 | 1 | CRACKING | [(x21,y21), (x22,y22), …] | { "confidence": 0.7, "width": 0.4, } |
| 3 | 1 | EFFLORE-SCENCE | [(x31,y31), (x32,y32), …] | { "confidence": 0.7, } |
| 4 | 2 | CRACKING | [(x41,y41), (x42,y42), …] | { "confidence": 0.6, "width": 0.8, } |
| 5 | 2 | CRACKING | [(x51,y51), (x52,y52), …] | { "confidence": 0.8, "width": 1.0, } |
| 6 | 3 | SPALLING | [(x61,y61), (x62,y62), …] | { "confidence": 0.9, "steel_exposed": true } |
| … | … | … | … | … |

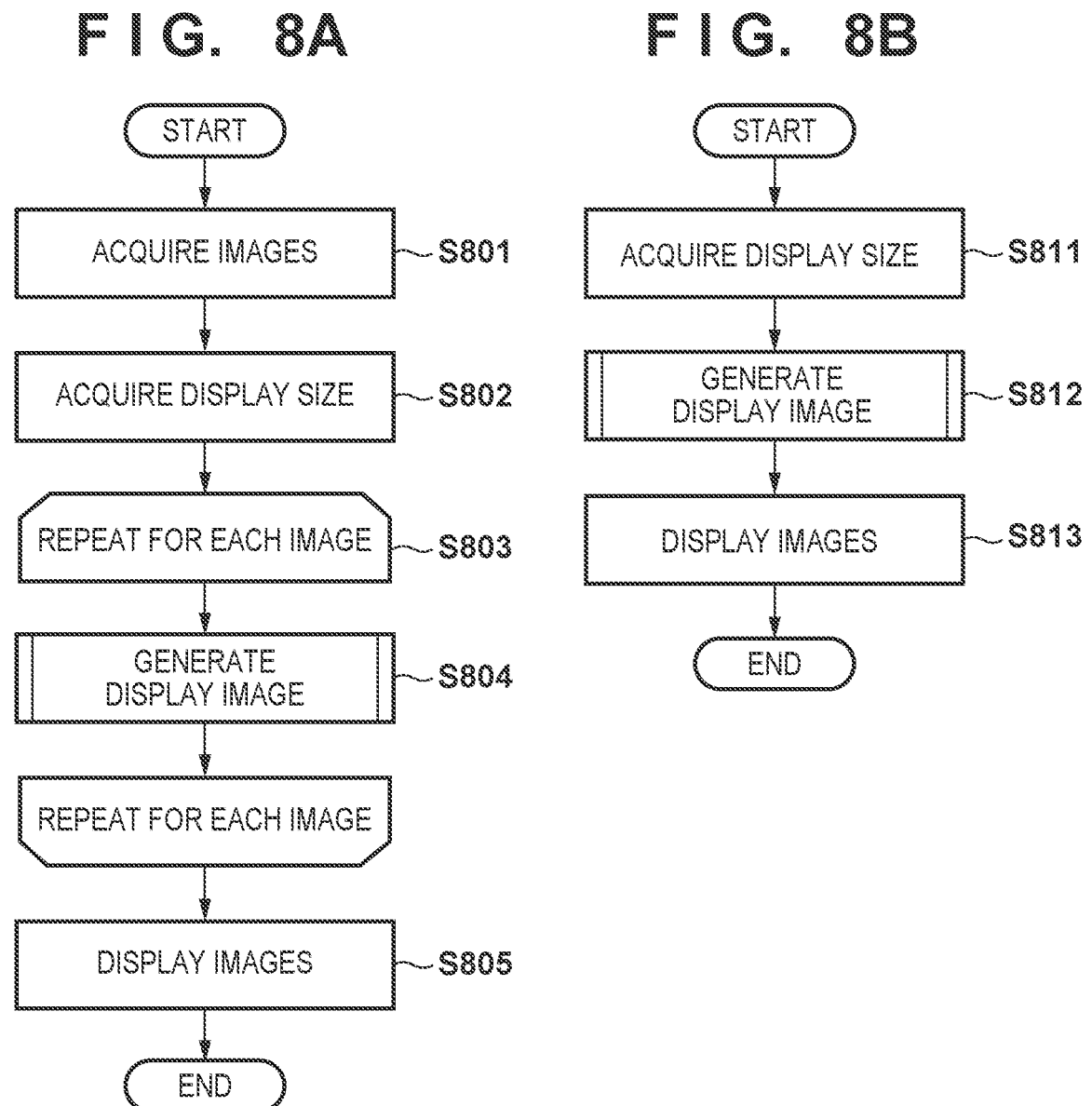
F I G. 8A
F I G. 8B

IMAGE PROCESSING APPARATUS AND CONTROL METHOD

BACKGROUND OF THE INVENTION

Field of the Invention

The present invention relates to techniques for detecting a defect from an image in which an inspection target is captured and displaying the defect.

Description of the Related Art

There is a method of detecting a defect, such as cracking, by performing an image analysis on an image in which an inspection target, such as a wall surface of a concrete structure, is captured. Meanwhile, when there is a large number of images in which an inspection target is captured, it becomes difficult to comprehend the images and their defect detection results.

Japanese Patent No. 4848532 describes a method of detecting crack information from images of a road surface in which the road surface is captured, and displaying in an arrangement in one screen, images in which an image of a road surface and crack information are reduced and overlaid.

However, in Japanese Patent No. 4848532, it may be difficult to observe a defect detection result depending on the distribution pattern of defects. For example, when detected defects are close to each other, the defects are rendered to overlap, making it difficult to discern the shapes of the defects. Further, when defects are displayed to be color-coded by attribute (such as a crack width) of the defects, appearances of colors may change depending on the degree of reduction and colors of neighboring defects.

SUMMARY OF THE INVENTION

The present invention has been made in consideration of the aforementioned problems, and realizes techniques for making it easier than before to comprehend an image in which an inspection target is captured and a defect detection result.

In order to solve the aforementioned problems, the present invention provides an image processing apparatus comprising: a display control unit configured to display defect information detected from an image in which an inspection target is captured, on a display unit in association with the image, wherein the display control unit controls a method of displaying the defect information based on a display size of at least one of the image and the defect information.

In order to solve the aforementioned problems, the present invention provides a method of controlling an image processing apparatus comprising: displaying defect information detected from an image in which an inspection target is captured, on a display unit in association with the image, wherein in the displaying, a method of displaying the defect information is controlled based on a display size of at least one of the image and the defect information.

In order to solve the aforementioned problems, the present invention provides a non-transitory computer-readable storage medium storing a program for causing a computer to execute a method of controlling an image processing apparatus comprising: displaying defect information detected from an image in which an inspection target is captured, on a display unit in association with the image, wherein in the displaying, a method of displaying the defect information is controlled based on a display size of at least one of the image and the defect information.

According to the present invention, an image in which an inspection target is captured and a defect detection result can be more easily comprehend than before.

Further features of the present invention will become apparent from the following description of exemplary embodiments (with reference to the attached drawings).

BRIEF DESCRIPTION OF THE DRAWINGS

FIGS. 3A1, 3A2, 3B1, 3B2, 3C1, 3C2, 3D1, 3D2, 3E1, and 3E2 are diagrams illustrating display appearances of defect information according to the present embodiment.

FIG. 4 is a diagram illustrating a change in a display appearance of defect information according to a display size of an image.

FIG. 6 is a diagram of a data structure of a defect information table.

FIGS. 8A and 8B are flowcharts illustrating processing for controlling display of thumbnail images and a detailed image.

DESCRIPTION OF THE EMBODIMENTS

Figure 1:
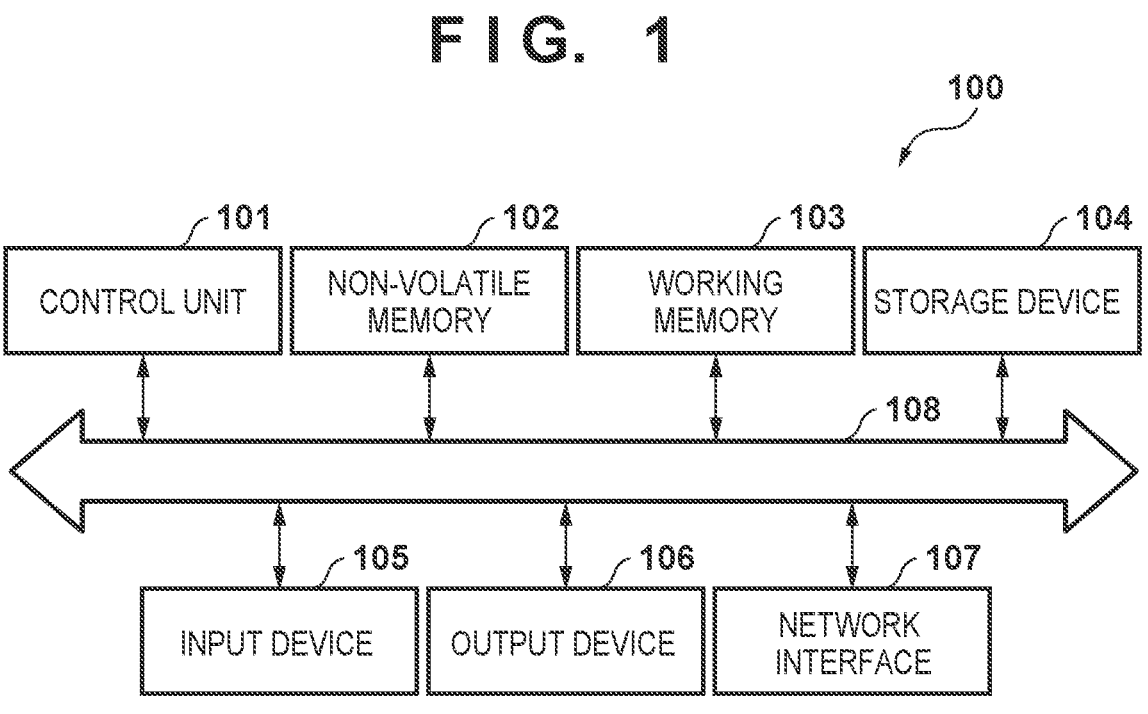
FIG. 1 is a block diagram illustrating a hardware configuration of an image processing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following describes an embodiment in which an image processing apparatus of the present invention is applied to a computer apparatus used for inspection of infrastructure, such as a concrete structure.

In the present embodiment, an example in which the computer apparatus operates as the image processing apparatus and controls a method of displaying defect information detected from an image (detection image) in which an inspection target is captured according to a display size of the detection image when displaying the detection image and the defect information in association with each other will be described.

In the present embodiment, an "inspection target" is a concrete structure to be inspected, such as a motorway, a bridge, a tunnel, or a dam. The image processing apparatus performs defect detection processing for detecting whether there is a defect, such as cracking, and a state thereof, using an image in which an inspection target is captured by a user. In addition, in a case of a concrete structure, a "defect" is, for example, cracking, floating, or spalling of concrete. A "defect" also includes as other examples, efflorescence (crystalline deposit of salts), rebar exposure, rust, water leakage, water dripping, corrosion, damage (deficiency), cold joint, deposition, rock pocket, and the like.

<Hardware Configuration>

First, a hardware configuration of an image processing apparatus 100 according to the present embodiment will be described with reference to FIG. 1.

FIG. 1 is a block diagram illustrating a hardware configuration of the image processing apparatus 100 according to the present embodiment.

The processing of the embodiment, which will be described below, may be realized by a single computer apparatus or may be realized by functions being distributed as necessary among a plurality of computer apparatuses. The plurality of computer apparatuses are connected to each other so as to be capable of communication.

The image processing apparatus 100 includes a control unit 101, a non-volatile memory 102, a working memory 103, a storage device 104, an input device 105, an output device 106, a network interface 107, and a system bus 108.

The control unit 101 includes a computational processor, such as a CPU or an MPU, for comprehensively controlling the entire image processing apparatus 100. The non-volatile memory 102 is a ROM for storing a program to be executed by the processor of the control unit 101 and parameters. Here, the program is a program for executing display control processing, which will be described later. The working memory 103 is a RAM for temporarily storing programs and data supplied from an external apparatus and the like. The storage device 104 is an internal device, such as a hard disk or a memory card incorporated in the image processing apparatus 100, or an external device, such as a hard disk or a memory card connected to the image processing apparatus 100 so as to be capable of being attached thereto and detached therefrom. The storage device 104 includes a memory card, a hard disk, and the like configured by a semiconductor memory, a magnetic disk, and the like. The storage device 104 also includes a storage medium configured by a disk drive for reading data from and writing data to an optical disk, such as a CD, a DVD, or a Blu-ray® Disc.

The input device 105 is an operation member, such as a mouse, a keyboard, or a touch panel for receiving a user operation, and outputs operation instructions to the control unit 101. The output device 106 is a display device, such as a display or a monitor configured by an LCD or organic EL, and displays data held by the image processing apparatus 100 and data supplied from an external device. The network interface 107 is connected to a network, such as the Internet or a local area network (LAN), so as to be capable of communication. The system bus 108 is configured to connect each of the components 101 to 107 of the image processing apparatus 100 so as to exchange data.

The non-volatile memory 102 or the storage device 104 stores an operating system (OS), which is basic software to be executed by the control unit 101, and applications for realizing applied functions in cooperation with the OS. Further, in the present embodiment, the non-volatile memory 102 or the storage device 104 stores an application for realizing image analysis processing to be described later in which the image processing apparatus 100 detects a defect from an image in which an inspection target is captured.

The processing of the image processing apparatus 100 according to the present embodiment is realized by reading software provided by the application. Assume that the application includes software for utilizing basic functions of the OS installed in the image processing apparatus 100. The OS of the image processing apparatus 100 may include software for realizing the processing in the present embodiment.

<Functional Configuration>

Next, functional blocks of the image processing apparatus 100 according to the present embodiment will be described with reference to FIG. 2.

Figure 2:
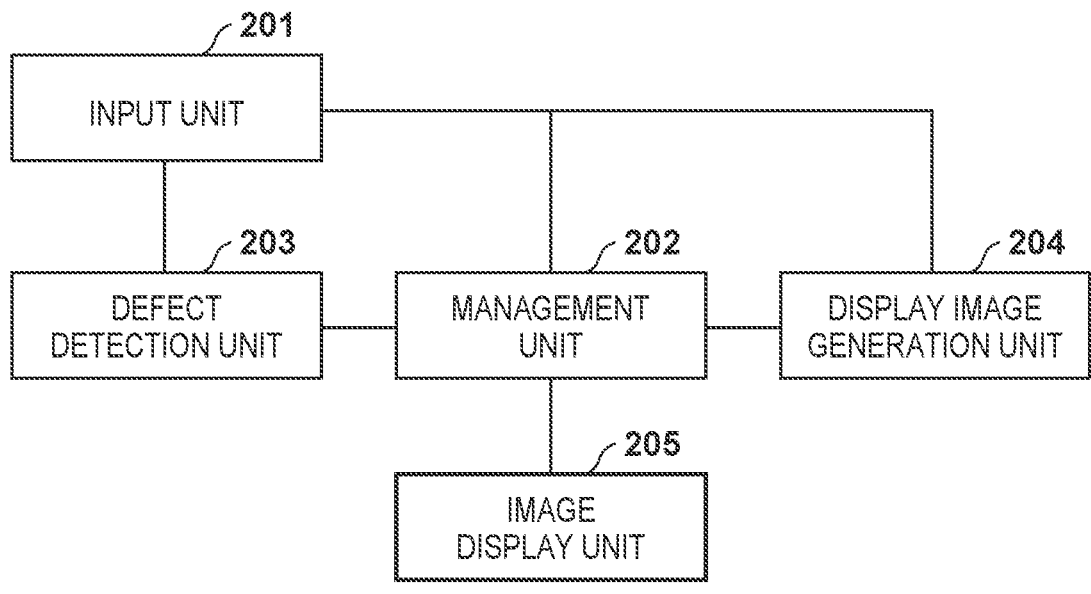
FIG. 2 is a functional block diagram of the image processing apparatus according to the present embodiment.

FIG. 2 is a functional block diagram of the image processing apparatus 100 according to the present embodiment.

The image processing apparatus 100 includes an input unit 201, a management unit 202, a defect detection unit 203, a display image generation unit 204, and an image display unit 205. Each function of the image processing apparatus 100 is configured by hardware and software. A configuration may be taken such that each functional unit is configured by one or more computer apparatuses or server apparatuses, and these constitute a system connected by a network.

The input unit 201 acquires an image from an external device, such as a camera, via the network interface 107 and stores the image as an image to be described later for detecting a defect (hereinafter, referred to as a detection image) in the storage device 104. Further, the input unit generates image information for the image processing apparatus 100 to manage the detection image and stores the image information in an image information table 500, which will be described later in FIG. 5.

The management unit 202 performs management, such as registration, deletion, and updating of image information, defect information, and the like. The image information is managed in the image information table 500, which will be described later in FIG. 5. The defect information is managed in a defect information table 600, which will be described later in FIG. 6. Further, the management unit 202 manages a defect detection model; numerical values to be referenced in display control processing, which will be described later in and FIGS. 8A and 8B and FIG. 9; and the like.

The defect detection unit 203 acquires defect information by performing defect detection processing on a detection image. The defect information includes a type of a defect, a shape of the defect, and other attributes of the defect. Further, the defect detection unit 203 acquires a detection result for each detection image. The detection result for each detection image includes a type of a distribution pattern of defects (such as alligator cracking, closed cracking), a degree of damage, and the like. Regarding the type of the distribution pattern of defects, when there is no distribution pattern of defects in a detection image, information such as the type of the distribution pattern of defects is not acquired. In defect detection processing performed by the defect detection unit 203, a model trained by machine learning is used. In this case, for example, a plurality of training data, which is a combination of input data and output data for defect detection processing, are prepared, and a trained model, which has acquired knowledge by machine learning from the training data and outputs, as a result, output data corresponding to input data based on the acquired knowledge, is generated. The trained model may be configured by, for example, a neural network model. The trained model may be updated as necessary after a certain process.

The display image generation unit 204 generates a display image for display on the image display unit 205 according to a display size of a detection image. The display image is an image which is resized in accordance with a size of a display region and for which defect information detected from the detection image is superimposed on the detection image.

The image display unit 205 displays the display image generated by the display image generation unit 204.

FIGS. 3A1, 3A2, 3B1, 3B2, 3C1, 3C2, 3D1, 3D2, 3E1, and 3E2 illustrate display appearances of defect information according to the present embodiment. When a display size of a detection image is small, defect information superimposed on the detection image is displayed to be simplified. Examples of simple display include thinning of defects; simplification of a defect shape; limitation of a display appearance, such as a color in which a defect is rendered, a line width, and a line type; display of an icon and/or a character string of a defect type; heat map display; and the like.

The thinning of defects is a display appearance for mitigating a difficulty in visibility of defects due to crowding of the defects, and visualizes a region in which defects existed since the region in which defects existed before thinning out the defects cannot be perceived due to the thinning. FIG. 3A2 illustrates a state in which defects are displayed after being thinned out with respect to FIG. 3A1. Some of the polylines indicating cracking are deleted, and a region containing the deleted polylines is visualized.

The simplification of a defect shape is a display appearance for making it easy to comprehend a general shape of a defect by simplifying a defect shape. FIG. 3B2 illustrates a state in which a defect shape is simplified with respect to FIG. 3B1. Vertices of polylines indicating a shape of cracking are reduced.

The limitation of a color in which a defect is rendered, a line width, and a line type is a display appearance for making it easy to comprehend a position and a shape of a defect by limiting a rendering color, a line width, and a line type when at least one of a color in which the defect is rendered, a line width, and a line type is changed in accordance with an attribute of the defect. FIG. 3C2 illustrates a state in which a color in which a defect is rendered is limited with respect to FIG. 3C1. A color in which a polyline representing cracking is rendered is limited, and polylines are rendered in a single rendering color.

The display of an icon and/or a character string of a defect type is a display appearance that enables a user to comprehend a characteristic of a defect at a glance, by expressing a distribution pattern of defects using an icon and/or a character string. FIG. 3D2 illustrates a state in which a defect type is expressed using an icon and/or a character string with respect to FIG. 3D1. Since cracking is in a distribution pattern called "alligator cracking", an icon representing "alligator cracking" is displayed.

The heat map display is a display appearance for mitigating a difficulty in visibility of defects due to crowding of the defects by visualizing a spatial density of the defects by a change in hue or a shade of color. FIG. 3E2 illustrates a state in which defects are displayed in a heat map with respect to FIG. 3E1. A density of cracking is expressed by a shade of color.

When a display size of a detection image is large, defect information is displayed in detail. For example, a method of displaying defect information in detail includes visualization of defect information according to an attribute of the defect information. The visualization of defect information according to an attribute of defect information is a display appearance for visualizing an attribute of defect information using at least one of a rendering color, a line width, a line type, and the like.

FIG. 4 is a diagram illustrating a change in a display appearance of defect information according to a display size of a detection image. The example of FIG. 4 indicates an example in which the larger the display size of the detection image, the more the shape of the defect is displayed in detail, and the smaller the display size of the detection image, the more the shape of the defect is displayed to be simplified.

<Processing for Controlling Display of Detection Image and Defect Information>

Next, processing for controlling display of a detection image and defect information according to the present embodiment will be described with reference to FIGS. 5 to 9.

Figure 5:
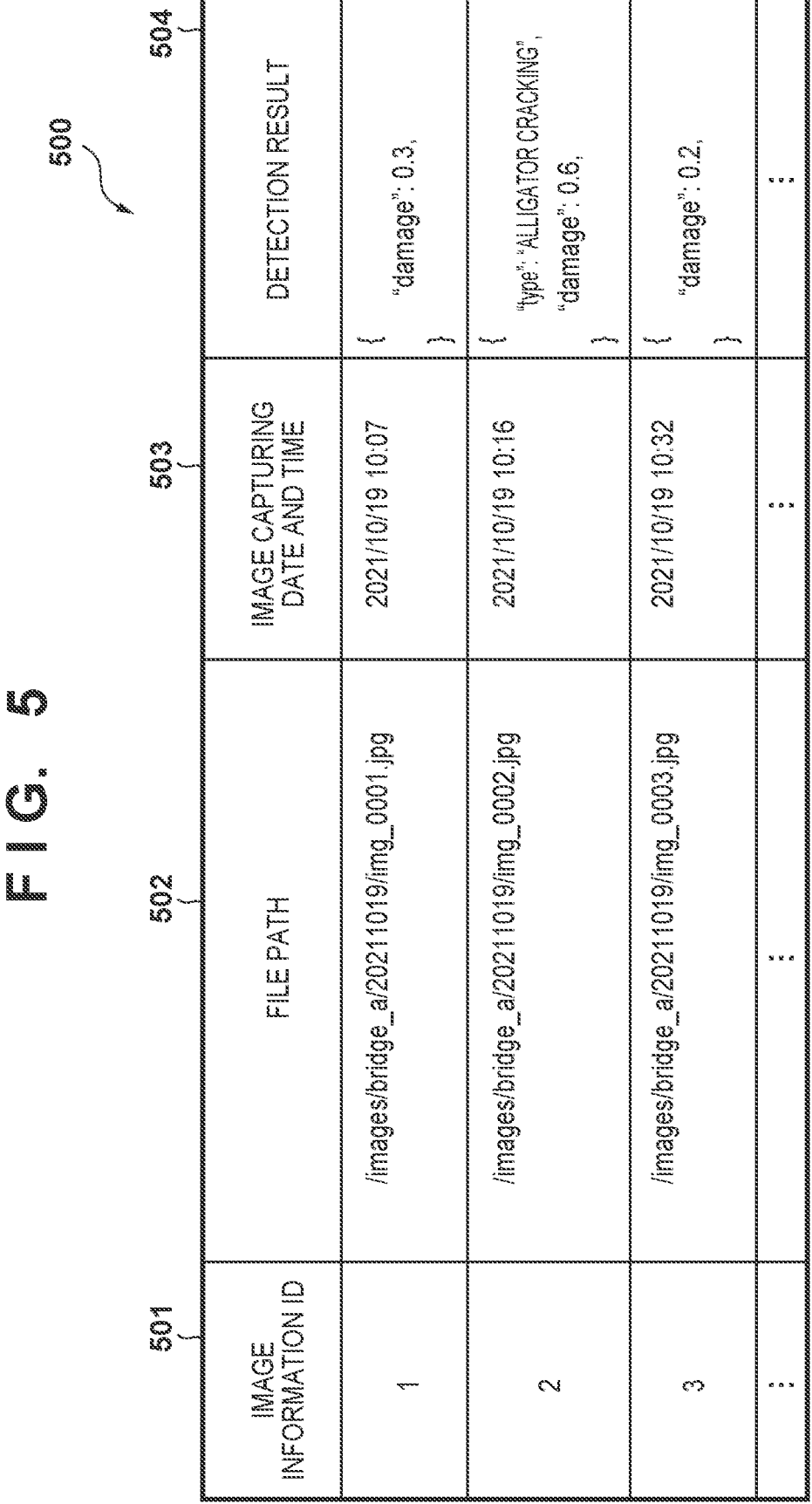
FIG. 5 is a diagram of a data structure of an image information table.

FIG. 5 illustrates the image information table 500 for managing image information. In the example of FIG. 5, each record of the image information table 500 indicates one piece of image information.

An image information ID 501 contains identification information for uniquely identifying image information stored in the image information table 500.

A file path 502 contains a character string representing a storage location of a detection image in the storage device 104.

An image capturing date and time 503 contains a character string representing a date and time at which the detection image is captured.

A detection result 504 contains a defect detection processing result for each detection image. The defect detection processing result includes a type of a distribution pattern of defects, a degree of damage, and the like.

FIG. 6 illustrates the defect information table 600 for managing defect information. In the example of FIG. 6, each record of the defect information table 600 indicates one piece of defect information.

A defect information ID 601 contains identification information for uniquely identifying defect information stored in the defect information table 600.

An image information ID 602 contains the identification information of image information corresponding to a detection image in which the defect information is detected.

A type 603 contains a string representing a type of a defect. Examples of the type 603 include cracking, efflorescence, floating, spalling, a rock pocket, a cold joint, and the like.

A shape 604 contains information representing a shape of a defect. For example, the shape 604 of defect information whose type 603 is "cracking" is a polyline representing a shape of the cracking. In addition, the shape 604 of defect information whose type 603 is "efflorescence" is a polygon representing a range of the efflorescence.

An attribute 605 contains information representing an attribute of a defect. The attribute 605 changes in its possible value depending on the type 603. For example, the attribute 605 for when the type 603 is "cracking" is a likelihood of a defect detection result, a width of the cracking, and the like. In addition, the attribute 605 whose type 603 is "spalling" is a likelihood of a defect detection result, whether there is exposure of reinforcing steel, and the like.

Figure 7:
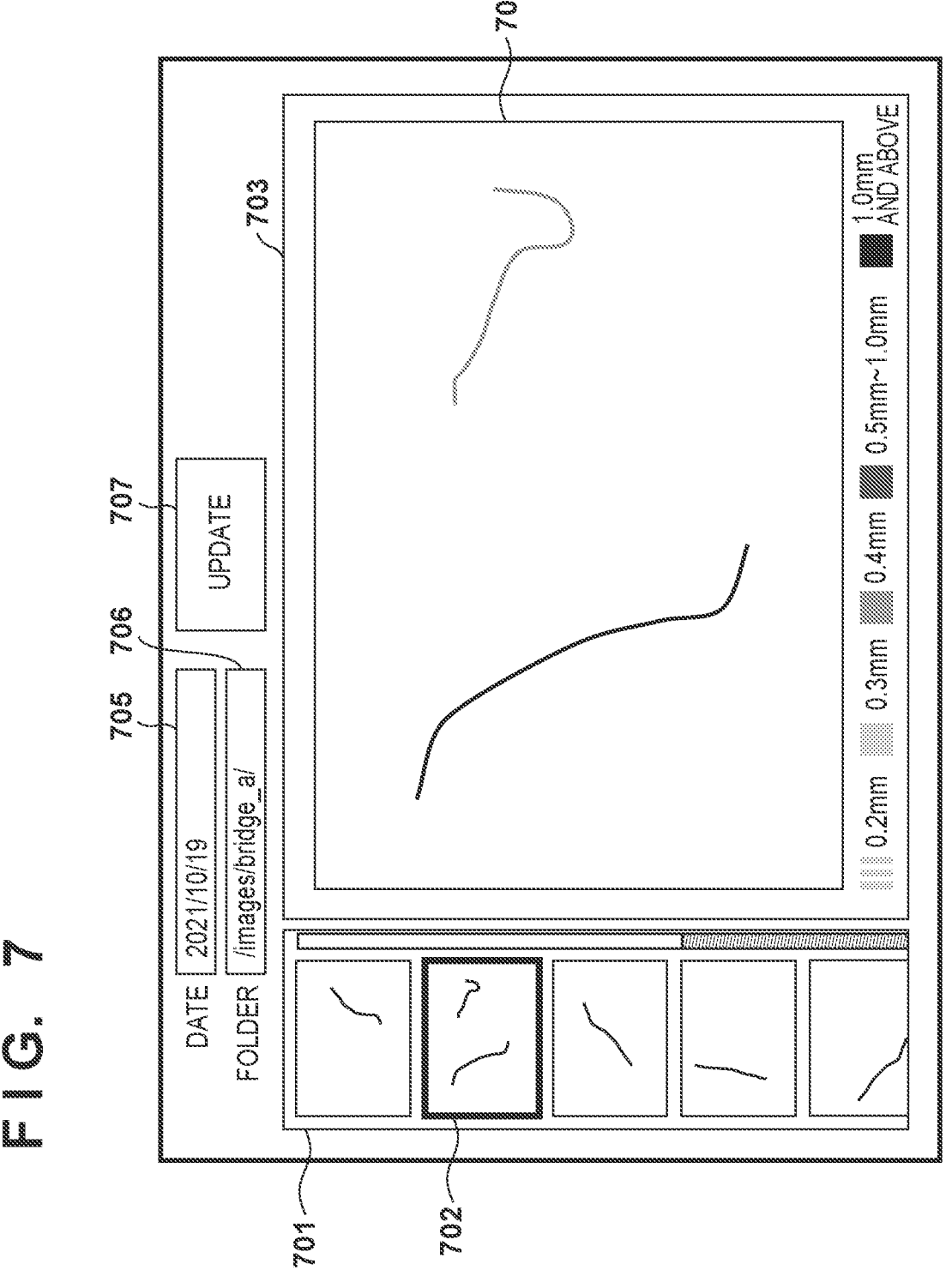
FIG. 7 is a diagram illustrating a GUI for a defect detection result according to the present embodiment.

FIG. 7 illustrates a graphical user interface (GUI) for a defect detection result provided by an application according to the present embodiment.

A thumbnail display region 701 is a region for displaying defect information to be simplified. The thumbnail display region 701 displays a list of thumbnail images 702, which will be described later, so as to be selectable.

A thumbnail image 702 is an image that is simplified so as to enable the user to get a general sense of a detection image and defect information detected from the detection image at a glance, and displays the detection image after it is reduced, by lowering its resolution or compressing it to reduce its file size. When a user selects a thumbnail image 702 in the GUI by operating the input device 105, the selected thumbnail image 702 is displayed to be emphasized. In FIG. 7, the selected thumbnail image 702 is displayed to be emphasized, by a thick frame.

A detailed display region 703 is a region for displaying defect information in detail. The detailed display region 703 displays a detailed image 704, which will be described later. The user can zoom and scroll in the detailed image 704 in GUI by operating the input device 105.

The detailed image 704 is an image by which the user is enabled to observe details of a detection image and defect information detected from the detection image by displaying the detection image to be enlarged, at its original file size.

A date and time specification box 705 is an input element for specifying a date and time for narrowing down the thumbnail images 702 to be displayed in the thumbnail display region 701. The user can specify a particular date and time or date and time range in the GUI by operating the input device 105.

A folder specification box 706 is an input element for specifying a folder path for narrowing down the thumbnail images 702 to be displayed in the thumbnail display region 701. The user can perform input in the GUI by operating the input device 105, and when the user selects a thumbnail image in the GUI by operating the input device 105, a file path for the original detection image corresponding to the selected thumbnail image is automatically inputted.

An update button 707 is a button for inputting a timing at which processing for displaying the thumbnail images 702 in the thumbnail display region 701, which will be described later in FIG. 8A, is executed. When the user, for example, changes input information of the date and time specification box 705 or the folder specification box 706 and operates the update button 707 in the GUI by operating the input device 105, a display of a list of the thumbnail images 702 of the thumbnail display region 701 is updated.

A configuration may be taken to enable an operation of changing a ratio of a size of the thumbnail display region 701 and a size of the detailed display region 703 in the GUI. For example, it is possible to improve visibility by enlarging the thumbnail display region 701 to increase the number of the thumbnail images 702 to be displayed in the thumbnail display region 701.

FIGS. 8A and 8B are flowcharts illustrating processing for controlling display of a detection image and defect information according the present embodiment.

The processing of FIGS. 8A and 8B is realized by the control unit 101 of the image processing apparatus 100 illustrated in FIG. 1 controlling each of the components by loading and executing a program stored in the non-volatile memory 102 in the working memory 103, and executing the functions illustrated in FIG. 2.

In the following, it is assumed that a detection image is inputted by the input unit 201 and image information corresponding to the detection image is stored in the image information table 500 prior to a start of the processing of FIGS. 8A and 8B.

FIG. 8A is a flowchart illustrating processing for displaying the thumbnail images 702 in the thumbnail display region 701 of the GUI illustrated in FIG. 7. The processing of FIG. 8A is started at an activation of the image processing apparatus 100 or by being triggered by the user operating the update button 707 in the GUI by operating the input device 105.

In step S801, the management unit 202 acquires image information of all the detection images from the image information table 500 illustrated in FIG. 5. When a date and time or a date and time range is specified in the date and time specification box 705 of the GUI illustrated in FIG. 7, image information to be acquired may be limited to the specified date and time or date and time range. When a folder path is specified in the folder specification box 706 of the GUI illustrated in FIG. 7, image information to be acquired may be limited based on the specified folder path. For example, the specified folder path and a file path of image information are compared using begins-with matching, and only the image information that matches is acquired.

In step S802, the display image generation unit 204 acquires a display size of the thumbnail images 702. The display size may be a predetermined size or may be determined based on a size of the thumbnail display region 701.

In step S803, the display image generation unit 204 repeatedly performs display image generation processing of step S804, which will be described later, for each piece of image information acquired in step S801.

In step S804, the display image generation unit 204 generates a thumbnail image 702. Details of this processing will be described later in FIG. 9.

In step S805, the image display unit 205 displays a list of the thumbnail images 702 generated in step S804 in the thumbnail display region 701 of the GUI illustrated in FIG. 7. The thumbnail images 702 are displayed in a list in the thumbnail display region 701 based on the size of the thumbnail display region 701 and the display size of the thumbnail images 702.

FIG. 8B is a flowchart illustrating processing for displaying the detailed image 704 in the detailed display region 703 of the GUI illustrated in FIG. 7. The processing of FIG. 8B is started by being triggered by the user selecting one of the thumbnail images 702 displayed in the thumbnail display region 701 in the GUI by operating the input device 105. In this case, the management unit 202 acquires image information corresponding to the selected thumbnail image 702 from the image information table 500 illustrated in FIG. 5 and provides the display image generation unit 204 with the image information.

In step S811, the display image generation unit 204 acquires a display size of the detailed image 704. The display size may be a predetermined size or may be determined based on the size of the detailed display region 703.

In step S812, the display image generation unit 204 generates the detailed image 704. Details will be described later in FIG. 9.

In step S813, the image display unit 205 displays the detailed image 704 generated in step S812 in the detailed display region 703 of the GUI illustrated in FIG. 7.

Figure 9:
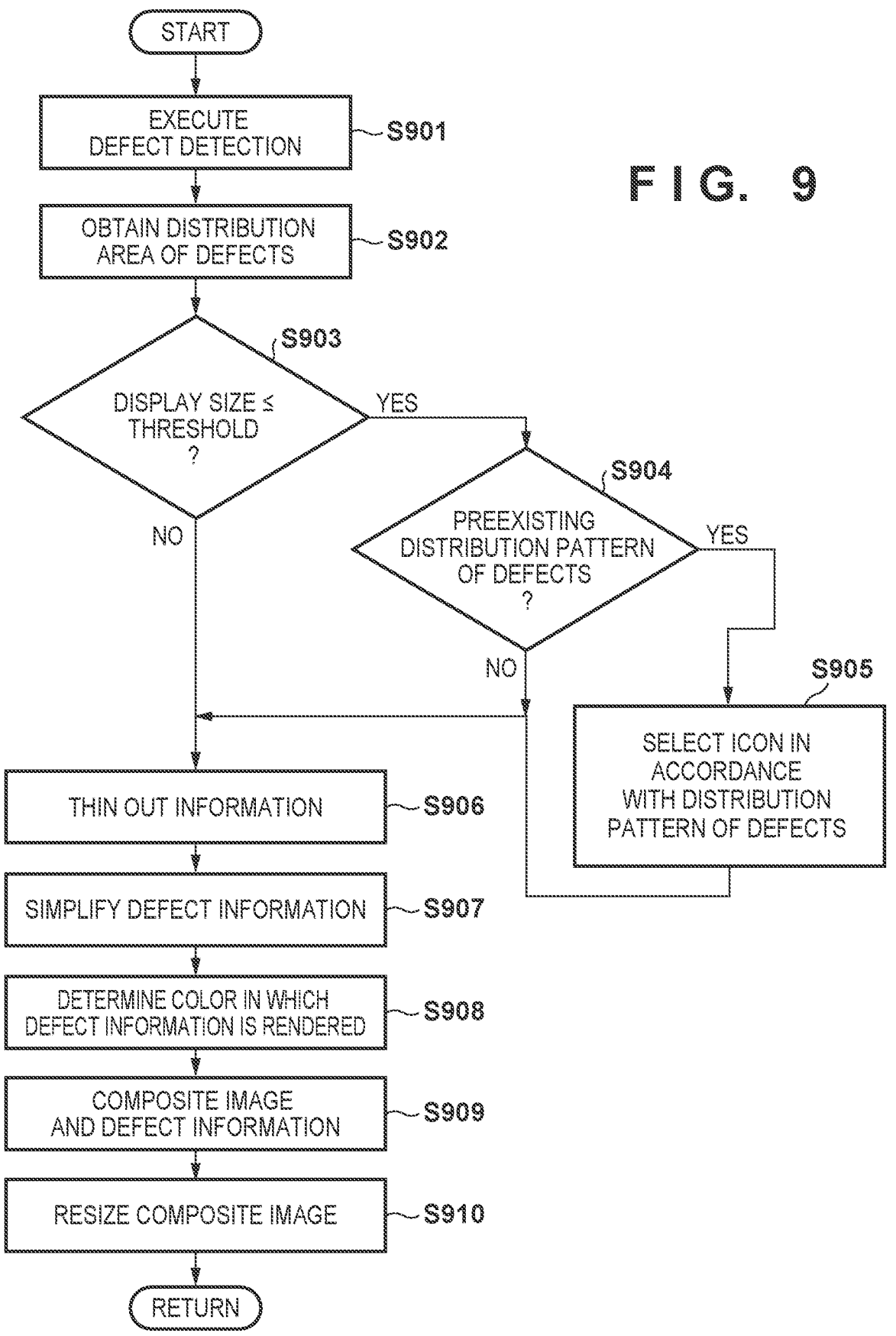
FIG. 9 is a flowchart illustrating display image generation processing of FIGS. 8A and 8B.

FIG. 9 is a flowchart illustrating display image generation processing in step S804 of FIG. 8A and step S812 of FIG. 8B.

In the processing of FIG. 9, the display image generation unit 204 is provided in advance with image information and a display size of a detection image.

Further, in the processing of FIG. 9, an example of thinning of defects; simplification of a defect shape; limitation of a display appearance, such as a color in which a defect is rendered; display of an icon and a character string of a defect type will be described as simplified display of defect information. Further, an example in which defect information is visualized according to an attributes of the defect information will be described as detailed display of defect information.

In step S901, the defect detection unit 203 acquires a detection image from the storage device 104 by referencing a file path of image information provided at the time of a start of the processing. In addition, the defect detection unit 203 performs defect detection processing on the detection image acquired from the storage device 104. Then, the defect detection unit 203 transmits a defect detection result for each detection image to the management unit 202. The management unit 202 stores defect information serving as a defect detection result for each detection image in the defect information table 600 illustrated in FIG. 6. In addition, the management unit 202 stores image information for each detection image in the image information table 500 illustrated in FIG. 5. The defect detection processing may be executed collectively at the time of image input.

In step S902, the display image generation unit 204 obtains a distribution area of defects. Specifically, a convex hull containing all the pieces of defect information is obtained. A configuration may be taken so as to perform clustering of defect information to obtain a convex hull for each cluster. A known technique, such as a k-means clustering, can be used for clustering.

In step S903, the display image generation unit 204 determines whether a display size of the detection image is a threshold or less. As a result of the determination, when the display size of the detection image is the threshold or less, the processing proceeds to step S904, and when the display size exceeds the threshold, the processing proceeds to step S906.

In step S904, the display image generation unit 204 determines whether the detection result 504 of the image information table 500 illustrated in FIG. 5 includes a "type of the distribution pattern of defects". As a result of the determination, when the detection result 504 of the image information illustrated in FIG. 5 includes the "type of the distribution pattern of defects", the processing proceeds to step S905, and when it is not included, the processing proceeds to step S906.

In step S905, the display image generation unit 204 acquires an icon or a character string representing the distribution pattern of defects. For example, when a detection result of the image information table 500 illustrated in FIG. 5 includes a type of the distribution pattern of defects called "alligator cracking", an icon or a character string representing alligator cracking is acquired. Both an icon and a character string may be acquired. A configuration may also be taken as to acquire either an icon or a character string by selecting either an icon or a character string according to the display size of the detection image.

In step S906, the display image generation unit 204 thins out defect information based on the display size of the detection image. The smaller the display size of the detection image, the greater the number or proportion of thinning. In this case, the number or proportion of thinning may be adjusted for each type of defect information. Further, when clustering of defect information is performed in step S902, defect information may be thinned out for each cluster. For determination of defect information to be thinned out, for example, a circumscribed rectangle is obtained from a shape of each piece of defect information and the circumscribed rectangles are selected in an ascending order of their sizes. Alternatively, defect information to be thinned out may be selected based on a likelihood of a defect detection result, which is one of the attributes of defect information.

In step S907, the display image generation unit 204 simplifies a shape of each piece of defect information based on the display size of the detection image. The smaller the display size of the detection image, the greater the degree of simplification. A known technique, such as a Douglas-Peucker method can be used for simplifying a shape.

In step S908, the display image generation unit 204 determines a color in which each piece of defect information is rendered based on the display size of the detection image. Here, a method of determining a rendering color will be described using an example of defect information representing cracking (defect information whose type is "cracking"). First, a range of possible values for a "width of cracking" is divided into a plurality of sections, and a look-up table in which a different rendering color is assigned to each section is prepared. In this case, the number of sections is determined such that the smaller the display size of the detection image, the smaller the number of sections. Next, a rendering color is acquired by referencing the look-up table according to a "width of cracking". Thus, when the display size of the detection image is large, a different rendering color can be acquired depending on the width of cracking, and when the display size of the detection image is small, the same rendering color can be acquired regardless of the width of cracking. A configuration may be taken such that the smaller the number of sections in the look-up table, a rendering color to be assigned to each section is selected from colors in high contrast to a representative color (such as an average value of all pixels) of the image. Further, a width and a style of a line and the like of each piece of defect information may be determined based on the display size of the detection image.

In step S909, the display image generation unit 204 generates a composite image in which defect information and the distribution area of defects obtained in step S902 are superimposed on the detection image. In this case, each piece of defect information is rendered in the rendering color determined in step S908. The distribution area of defects is composited when a ratio of a surface area of distribution area of defects to the entire detection image is a predetermined threshold or less. This makes it possible to prevent the distribution area of defects from being rendered across the entire detection image when the defects are distributed across the entire detection image.

In step S910, the display image generation unit 204 resizes the composite image generated in step S909 according to the display size of the detection image. In addition, the display image generation unit 204 composites an icon or a character string acquired in step S905 into the resized composite image. The icon or the character string may be composite so as to be rendered at a predetermined position (e.g., lower right) of the detection image or may be composited so as to be rendered in a vicinity of the defect information.

A configuration may be taken so as to display a display image to be emphasized, based on a degree of simplification of the defect information of the displayed image. It means that the greater the degree of simplicity, the greater the discrepancy in appearance from when the simplification is not performed, and in particular, when display images are displayed in a list as the thumbnail images 702, it serves as a guide for determining whether to confirm details. An indication for expressing the degree of simplification includes a display size of a detection image and the like. Examples of emphasized display include enlargement; outlining; animation, such as blinking; and the like.

In the processing of FIG. 9, the defect information and the like are composited into the detection image in step S909, and the composite image is resized in step S910; however, order of processing may be switched. The displayed image is obtained by compositing after the detection image, the defect information, and the distribution area of defects obtained in step S902 have been resized.

In addition, in the processing of FIG. 9, an icon or a character string representing a form in which defect information is distributed is composited into the detection image; however, when a detection result of image information includes a degree of damage, an icon or a character string representing a degree of damage may be obtained based on the degree of damage and composited into the detection image.

Further, in the processing of FIG. 9, the method of displaying defect information is controlled based on the display size of the detection image; however, the method of displaying defect information may be controlled based on a display size of the defect information. For example, when the display size of the defect information is small, it is difficult for the user to confirm the defect information, and so the defect information is displayed to be simplified. Meanwhile, when the display size of the defect information is large, the defect information is displayed in detail such that the user can confirm the defect information in detail (attribute and the like). When the method of displaying defect information is controlled based on the display size of the defect information, the display size of the defect information is obtained after step S902 of FIG. 9, and in step S903 and from step S906 to step S908, the display size of the defect information is referenced in place of the display size of the detection image. The display size of the defect information is obtained as follows.

First, the display image generation unit 204 obtains a resizing factor for when the detection image is resized in accordance with the display size of the detection image. Next, a distribution area of defect information is resized using the resizing factor. Next, a circumscribed rectangle is obtained from the resized distribution area of defect information, and its size is acquired. When the defect information is clustered to obtain a distribution area of defect information for each cluster, in order to obtain the display size of the defect information, the distribution area of defect information is resized and a size of a circumscribed rectangle is obtained for each cluster, and their representative values (such as average values) are acquired.

Further, in the processing of FIG. 9, the method of displaying defect information is controlled based on the display size of the detection image; however, the method of displaying defect information may be controlled based on a resolution of the detection image. In this case, the higher the resolution of the detection image, the more the defect information is displayed in detail, and the lower the resolution of the detection image, the more the defect information is displayed to be simplified.

As described above, according to the present embodiment, a display image is generated from a detection image and a display size of the detection image. In this case, a method of displaying defect information to be superimposed on the detection image is controlled based on the display size of the detection image. The larger the display size of the detection image, the more the defect information is displayed in detail, and the smaller the display size of the detection image, the more the defect information is displayed to be simplified. By this, the defect information is displayed at an appropriate roughness in accordance with the display size of the detection image, and so it is possible for the user to easily comprehend the detection image and content of the defect information detected from the detection image.

In the present embodiment, the display image generation processing of FIG. 9 is executed in the processing for displaying the thumbnail images 702 of FIG. 8A and the processing for displaying the detailed image 704 of FIG. 8B; however the display images may be generated at a different timing. For example, display images are generated prior to the processing of FIG. 8A when a detection image is inputted by the input unit 201. In the processing of FIGS. 8A and 8B, the display images generated in advance are obtained and displayed. This method is effective when the display size of the thumbnail images 702 and the display size the detailed image 704 are predetermined. Alternatively, the display images may be re-generated when a zoom ratio of the detailed image 704 displayed on the detailed display region 703 is changed.

In the present embodiment, an example in which the defect detection processing and the display image generation processing are executed in one device has been described; however, these processes may be executed in separate devices. This makes it is possible to use a device with low computational capabilities as a device for displaying the display images.

In the present embodiment, a thumbnail image 702 is generated by superimposing simplified defect information on a detection image and reducing that image; however, a thumbnail image 702 may be generated by reducing only a detection image without superimposing defect information. In this case, pixels after reduction are obtained by a known technique, such as a nearest neighbor interpolation. In addition, each pixel may be weighted using an evaluation value held for each pixel. Regarding the evaluation value of the pixel, for example, a likelihood that there is a defect in the pixel (the likelihood that there is a defect in the pixel is obtained in advance in the defect detection processing) can be used. Further, a configuration may be taken to enable an operation of switching of the thumbnail images 702 described in the present embodiment and the thumbnail images 702 obtained by reducing only the detection images.

In the present embodiment, the thumbnail images 702 are displayed in a list in the thumbnail display region 701 of the GUI illustrated in FIG. 7; however, it may be possible to sort or filter these based on image information corresponding to the thumbnail images 702 and defect information of the thumbnail images 702. For example, the thumbnail images 702 having the same value are sorted together based on a type of defect information or a detection result of image information (such as a type of the distribution pattern of defects). Alternatively, the thumbnail images 702 may be sorted based on a detection result (such as damage degree) of a certain position or above in an ordinal scale, among detection results of image information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080352, filed May 16, 2022 which is hereby incorporated by reference herein in its entirety.

What is claimed is:

1. An image processing apparatus comprising:
one or more memories storing instructions; and
one or more processors executing the instructions to:
display defect shape data detected from an image in which a concrete structure is captured, on the image,
wherein in the displaying, (1) a displayed shape of the defect shape data is polylines, and (2) a method of the displaying of the defect shape data is controlled based on a display size of at least one of the image and the defect shape data, and
wherein in the controlling, vertices of the displayed defect shape data are reduced in a case where the display size of the image is smaller than a threshold size.

2. The image processing apparatus according to claim 1, wherein the one or more processors further execute the instructions to detect a defect from the image, and
wherein in the displaying, the one or more processors display the defect shape data to be superimposed on the image such that a position of the defect shape data is aligned with the detected defect.

3. The image processing apparatus according to claim 1, wherein the one or more processors thin out the polylines in a case where the display size of the image is changed to be smaller than the threshold size.

4. The image processing apparatus according to claim 1, wherein the one or more processors reduce colors of the polylines in a case where the display size of the image is changed to be smaller than the threshold size.

5. The image processing apparatus according to claim 1, wherein the one or more processors display, in a first display region so as to be selectable, a list of first display images superimposed on a shape of the defect shape data of which the shape is simplified, and
wherein when one of the first display images is selected, the one or more processors display, in a second display region, a second display image superimposed on a detail shape of the defect shape data.

6. The image processing apparatus according to claim 1, wherein the defect shape data includes at least one of cracking, spalling, efflorescence, a cold joint, and a rock pocket.

7. A method of controlling an image processing apparatus, the method comprising:
displaying defect shape data detected from an image in which a concrete structure is captured, on the image,
wherein in the displaying, (1) a displayed shape of the defect shape data is polylines, and (2) a method of the displaying of the defect shape data is controlled based on a display size of at least one of the image and the defect shape data, and
wherein in the controlling, vertices of the displayed defect shape data are reduced in a case where the display size of the image is smaller than a threshold size.

8. A non-transitory computer-readable storage medium storing a program for causing a computer to execute a method of controlling an image processing apparatus, the method comprising:
displaying defect shape data detected from an image in which a concrete structure is captured, on the image,
wherein in the displaying, (1) a displayed shape of the defect shape data is polylines, and (2) a method of the displaying of the defect shape data is controlled based on a display size of at least one of the image and the defect shape data, and
wherein in the controlling, vertices of the displayed defect shape data are reduced in a case where the display size of the image is smaller than a threshold size.

* * * * *